(12) United States Patent
Larkin et al.

(10) Patent No.: US 6,505,679 B2
(45) Date of Patent: Jan. 14, 2003

(54) LOW-DISTORTION SECTOR PLATE FOR AIR PREHEATERS

(75) Inventors: James R. Larkin, Wellsville, NY (US); Kevin J. O'Boyle, Wellsville, NY (US); Michael Zakel, Wellsville, NY (US)

(73) Assignee: Alstom Power N.V., Amsterdam (NL)

( * ) Notice: Subject to any disclaimer, the term of this patent is extended or adjusted under 35 U.S.C. 154(b) by 101 days.

(21) Appl. No.: 09/790,102

(22) Filed: Feb. 21, 2001

(65) Prior Publication Data

US 2002/0112843 A1 Aug. 22, 2002

(51) Int. Cl.[7] ................................................. F23L 15/02
(52) U.S. Cl. ................................................. 165/9; 165/8
(58) Field of Search ................................. 165/8, 9, 10

(56) References Cited

U.S. PATENT DOCUMENTS

| | | | | |
|---|---|---|---|---|
| 2,744,731 A | * | 5/1956 | Brandt | 165/9 |
| 2,873,952 A | * | 2/1959 | Mudersbach et al. | 165/9 |
| 4,124,063 A | | 11/1978 | Stockman | 165/9 |
| 5,316,072 A | | 5/1994 | Seike et al. | 165/9 |
| 6,155,209 A | | 12/2000 | Finnemore | 122/1 A |
| 6,422,298 B1 | * | 7/2002 | Rhodes et al. | 165/8 |

FOREIGN PATENT DOCUMENTS

| | | | | |
|---|---|---|---|---|
| DE | 909 135 | | 4/1954 | |
| EP | 0 599 577 A1 | | 6/1994 | |
| GB | 0892317 | * | 3/1962 | 165/9 |
| JP | 0056784 | * | 3/1987 | 165/9 |
| WO | WO 96/24813 | | 8/1996 | |

* cited by examiner

Primary Examiner—Christopher Atkinson
(74) Attorney, Agent, or Firm—Alix, Yale & Ristas, LLP

(57) ABSTRACT

A sector plate for an air preheater including a seal plate having a sealing surface and an oppositely disposed mounting surface. Multiple tabs mount a portion of a rigid support structure to the mounting surface of the seal plate. Multiple support members mount the support structure to the air preheater.

19 Claims, 7 Drawing Sheets

PRIOR ART

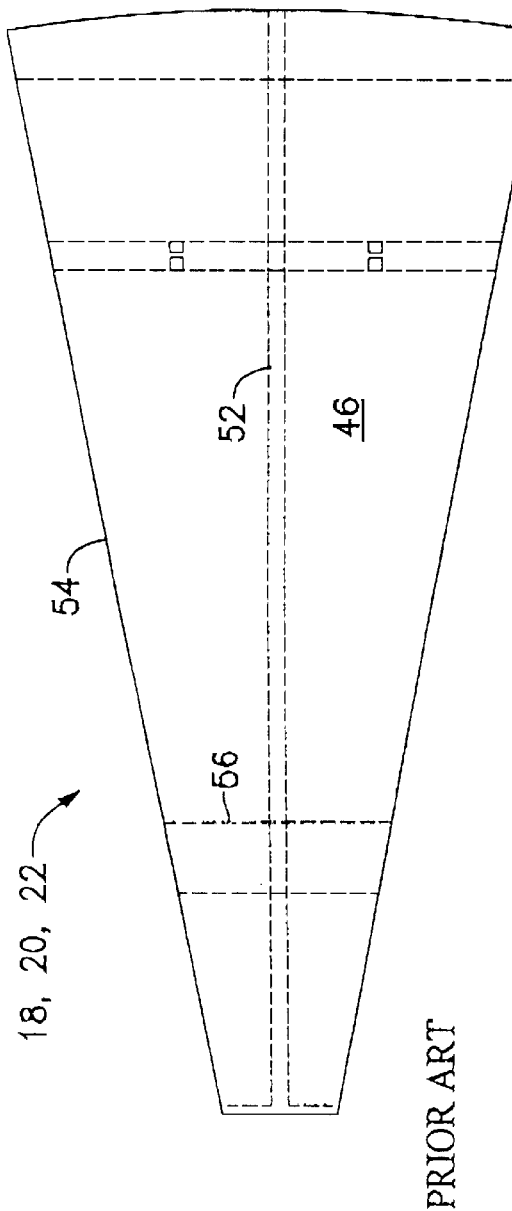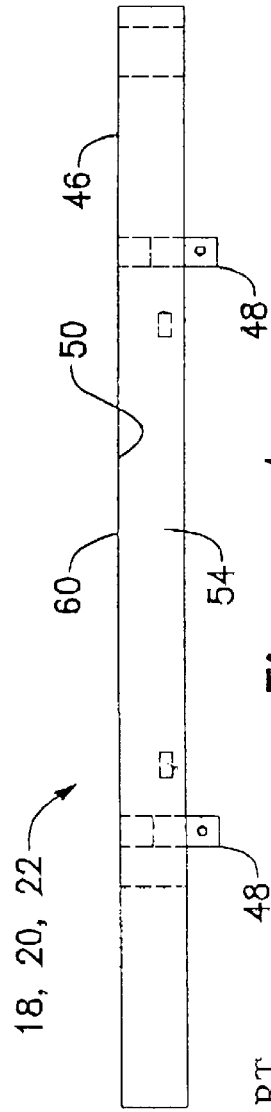
Figure 3
Figure 4
PRIOR ART

LOW-DISTORTION SECTOR PLATE FOR AIR PREHEATERS

BACKGROUND OF THE INVENTION

The present invention relates to the apparatus of a rotary regenerative air preheater. More particularly, the invention relates to the sector plate assemblies of an air preheaters.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is separated into a flue gas side or sector and one or more combustion air sides or sectors by sector plates. Conventional sector plate assemblies include numerous component parts, including multiple support ribs which are mounted to the backside of the seal plate for pressure stiffening. When completely assembled and welded together, the assembly forms an extremely stiff and rigid structure. The seal plate is then machined to a required flatness to attain the close sealing tolerances which are required. The sector plate assembly is costly because of the extensive machining required and the rigid nature of the sector plate assembly structure.

SUMMARY OF THE INVENTION

Briefly stated, the invention in a preferred form is a sector plate for an air preheater including a seal plate having a sealing surface and an oppositely disposed mounting surface. Multiple tabs mount a portion of a rigid support structure to the mounting surface of the seal plate. Multiple support members mount the support structure to the air preheater.

The support structure includes first and second side support ribs, which extend longitudinally from the inner end of the seal plate to the outer end of the seal plate, a single center support rib, which extends longitudinally from the outer end of the seal plate to a position intermediate the inner and outer ends of the seal plate, and multiple lateral support ribs. The tabs mount the lateral support ribs and the center support rib to the mounting surface of the seal plate and the side support ribs are welded to the seal plate. Each of the tabs has a first end portion welded to the support structure and an oppositely disposed second end welded along its full length to the mounting surface of the seal plate. The support members are mounted to each of the lateral support ribs adjacent one of the side support ribs.

Preferably, there are two inner lateral support ribs and four outer lateral support ribs. The inner lateral support ribs extend from the first side support rib to the second side support rib. A first pair of the outer lateral support ribs extend from the first side support rib to the center support rib and a second pair of the outer lateral support ribs extend from the second side support rib to the center support rib. The ends of the inner lateral support ribs are welded to the first and second side support ribs, the ends of the first pair of outer lateral support ribs are welded to the first side support rib and the center support rib, and the ends of the second pair of outer lateral support ribs are welded to the second side support rib and the, center support rib.

It is an object of the invention to provide a sector plate having a reduced number of structural parts.

It is also an object of the invention to provide a sector plate which requires less welding during construction.

It is further an object of the invention to provide a sector plate which requires no machining of the seal surface.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 3 is a top view of a conventional sector plate assembly.

FIG. 4 is a side view of the sector plate assembly of FIG. 3.

DESCRIPTION OF THE PREFERRED EMBODIMENT

Figure 1:
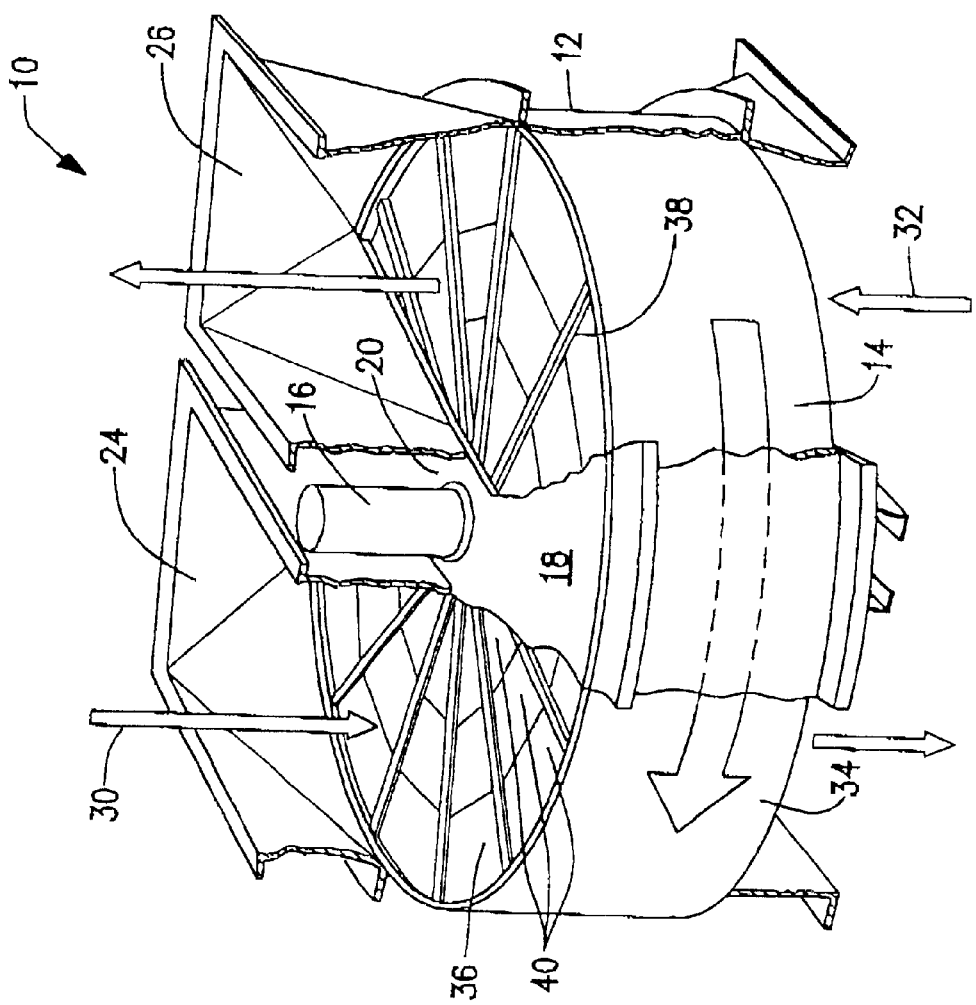
FIG. 1 is a general perspective view of a conventional bisector rotary regenerative air preheater which is cut-away to show the upper sector plate assemblies.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plate assemblies 18 and 20 into a flue gas sector 24 and an air sector 26. Corresponding sector plate assemblies are also located on the bottom of the unit. Mounted on the inside of the housing are axial seal plates (not shown) which extend the full height of the rotor.

The hot flue gases enter the air preheater 10 as indicated by the arrow 30, flow through the flue gas sector 24 where heat is transferred to the heat transfer surface in the rotor 14. As this hot heat transfer surface then rotates through the air sector 26, the heat is transferred to the air flowing through the rotor from the bottom as indicated by the arrow 32. Consequently, the cold air inlet and the cooled gas outlet define a cold bottom end and the hot gas inlet and the heated air outlet define a hot top end. The rotor 14 has a shell 34 and is divided into a plurality of pie-shaped compartments 36 by the diaphragm plates 38 with each compartment containing a plurality of heat exchange basket modules 40.

Figure 2:
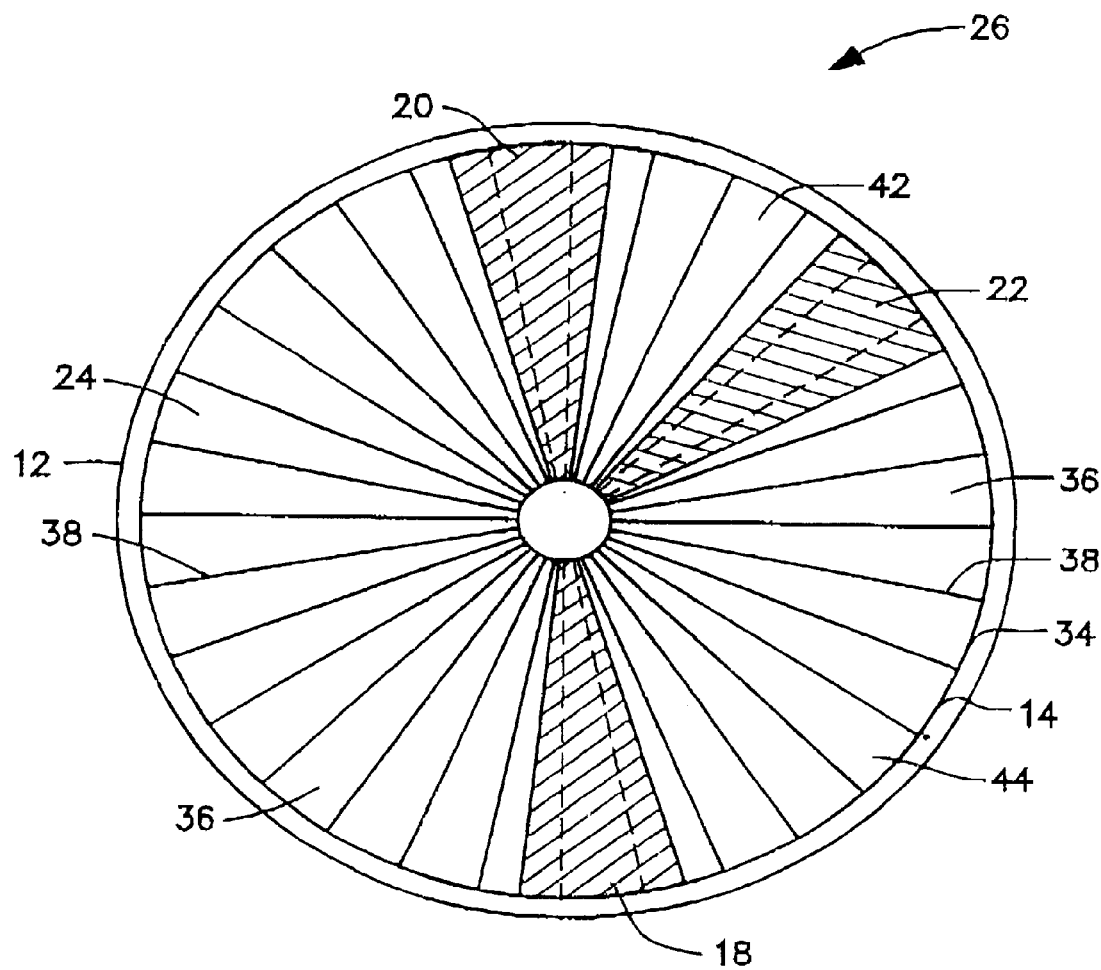
FIG. 2 is a simplified top view of a conventional trisector air preheater showing the rotor in the housing and showing the sector plate assemblies.
Figure 5:
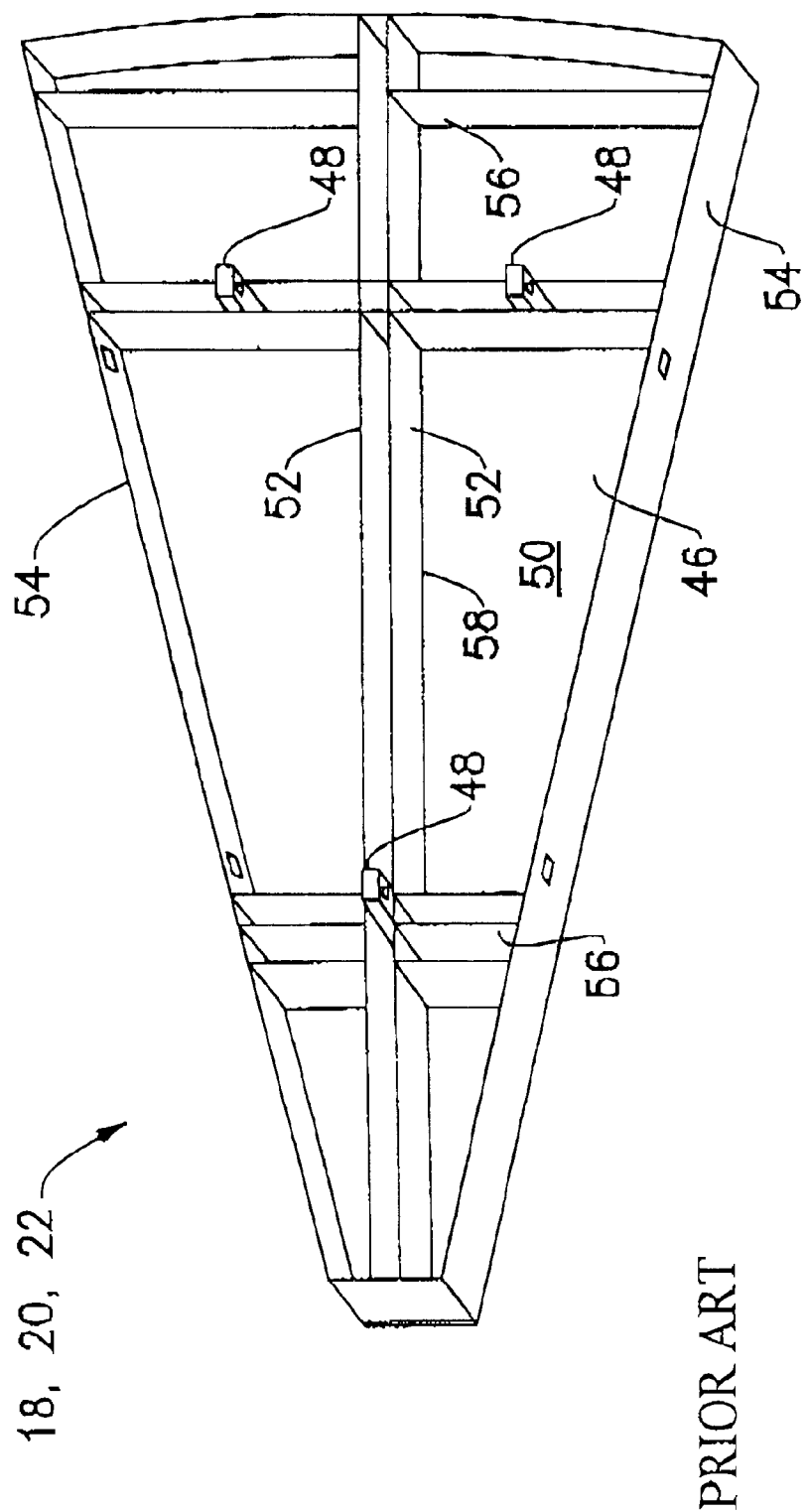
FIG. 5 is a bottom perspective view of the sector plate assembly of FIG. 3.
Figure 6:
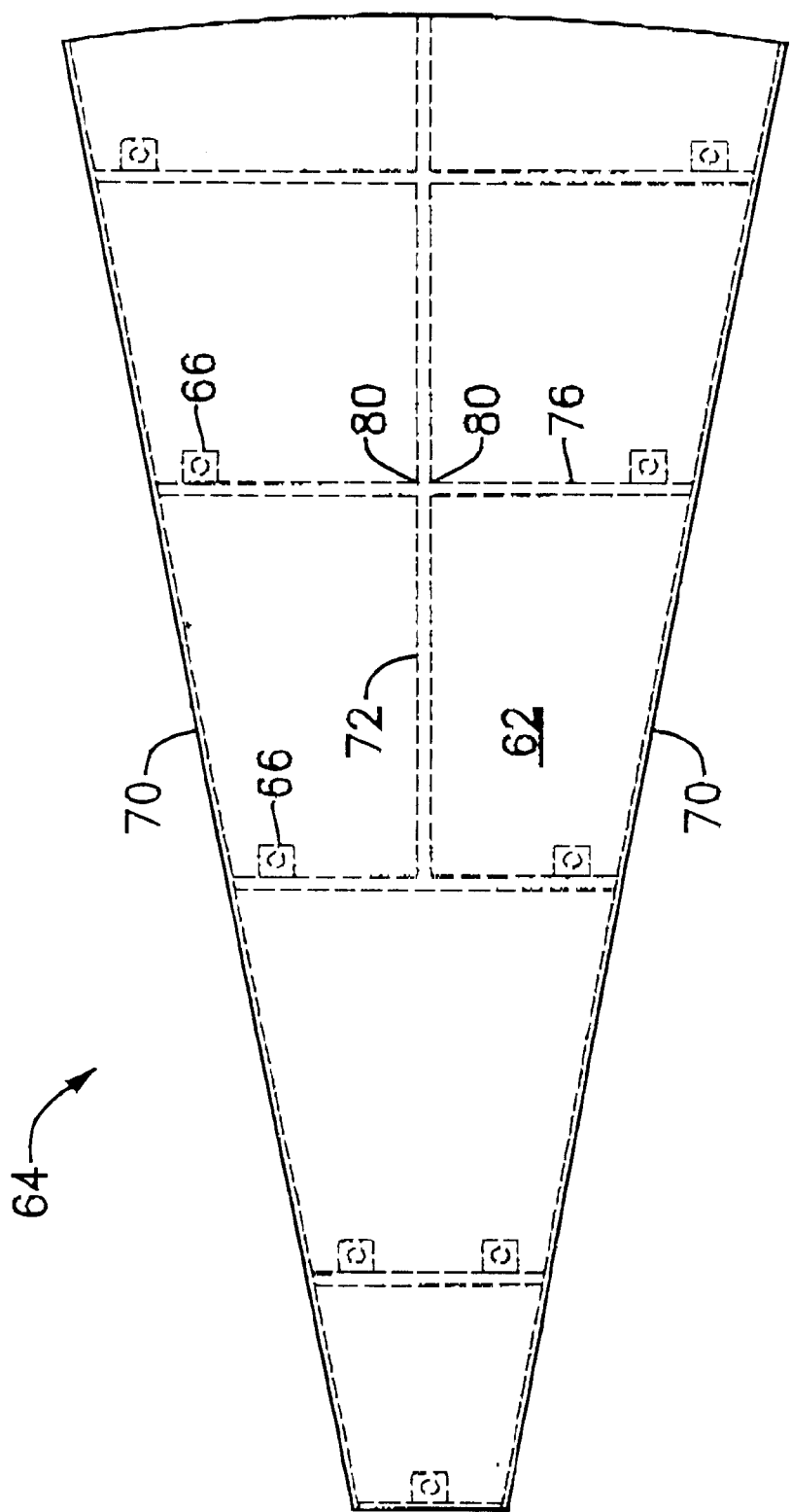
FIG. 6 is a top view of a low-distortion sector plate assembly in accordance with the invention.
Figure 7:
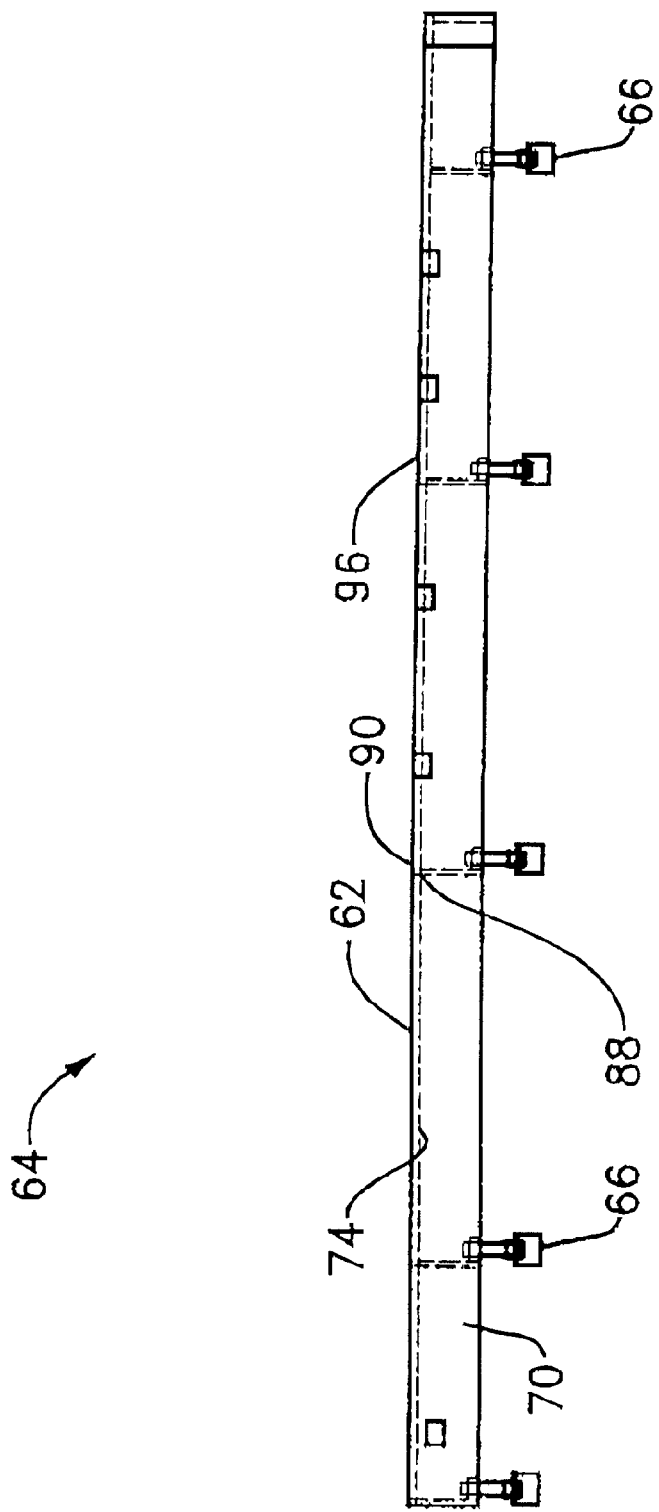
FIG. 7 is a side view of the sector plate assembly of FIG. 6.

FIG. 2 is a plan view representation of a conventional trisector air preheater comprising the rotor housing 12 and the rotor 14. The housing is divided in this case into three sectors by the sector plate assemblies 18, 20 and 22. The sectors are the flue gas sector 24 and the air sector 26 which is divided into the primary air sector 42 and the secondary air sector 44. This figure illustrates the sector plate assemblies in cross-section for purposes of clarity. The rotor 14 is composed of the shell 34 and the diaphragm plates 38 dividing the rotor into compartments 36.

In conventional air preheaters, the sector plate assemblies 18, 20, 22 include a seal plate 46 which is designed to be very rigid across its entire length. Three support rods 48 are mounted to the lower surface 50 of the seal plate 46 to support the sector plate assembly 18, 20, 22 on the preheater structure, thereby concentrating the weight and heat induced support forces at three points on the seal plate 46. Generally, two full-length center support ribs 52, two full-length side support ribs 54, and numerous lateral support ribs 56 are mounted to the seal plate 46 to provide an extremely stiff and rigid structure, such that the seal plate 46 cannot bow about the support points.

Each support rib 52, 54, 56 is mounted to the seal plate 46 by multiple spot welds 58. Such spot welds 58 cause the seal plate 46 to distort. Consequently, the upper surface 60 of the seal plate 46 must be machined after the sector plate 18, 20, 22 is assembled to attain the close sealing tolerances which are required. Due to the numerous welds 58 required to assemble the sector plate 18, 20, 22 and the extensive machining required to produce the necessary flatness, conventional sector plate assemblies 18, 20, 22 are expensive to manufacture.

The seal plate 62 of a low distortion sector plate assembly 64 in accordance with the subject invention is designed to be very rigid across the face of the seal plate 62, not across its length. In addition, nine L-shaped support members 66 are used to support the sector plate assembly 64 on the preheater structure, effectively distributing the weight and heat induced support forces over substantially the entire seal plate 62. Consequently, the support structure 68 required to ensure that the seal plate 62 is rigid is significantly reduced, compared to the support structure 52, 54, 56 of conventional sector plate assemblies 18, 20, 22.

Figure 8:
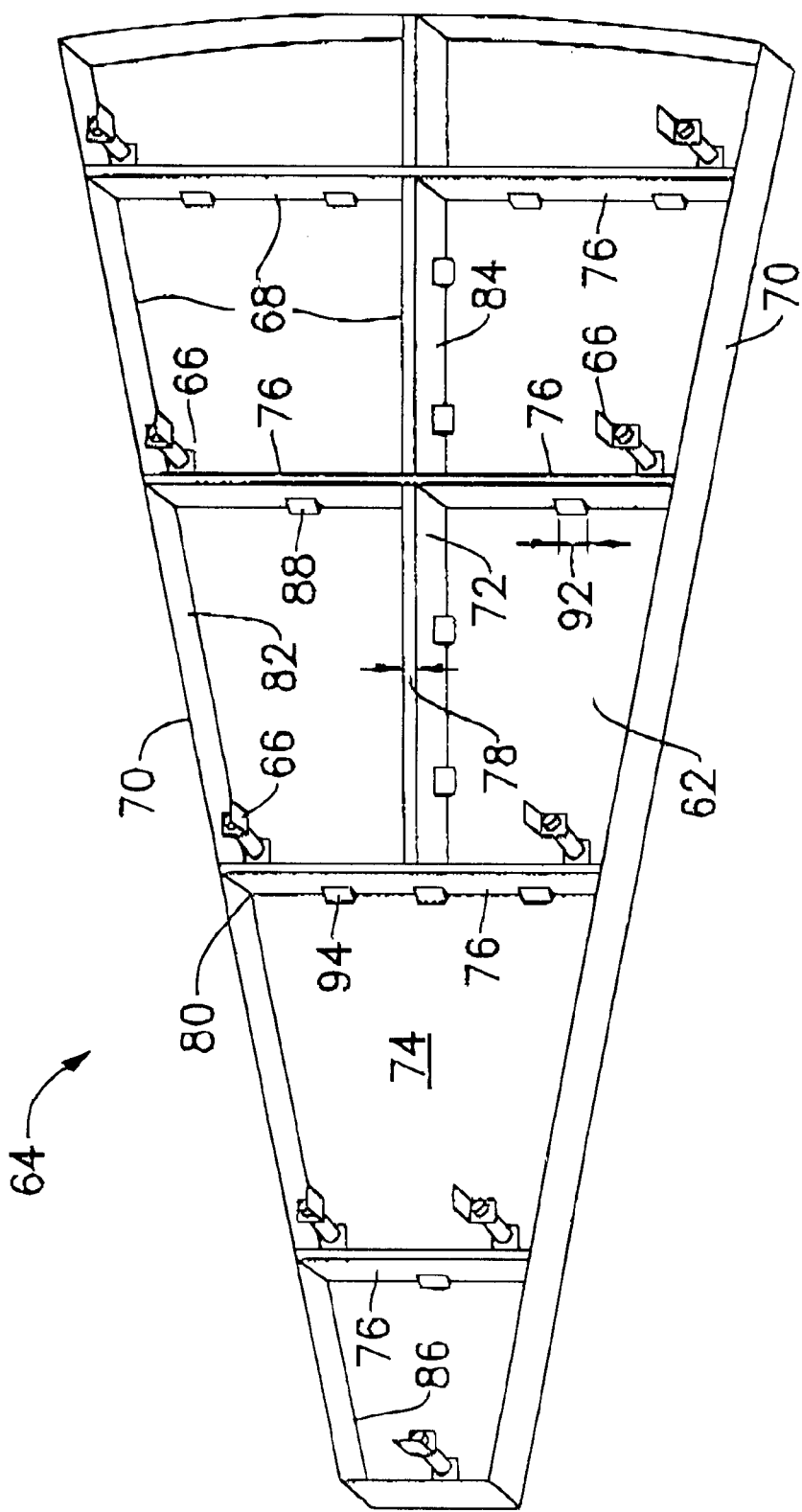
FIG. 8 is a bottom perspective view of the sector plate assembly of FIG. 6.

A pair of full-length side support ribs 70 and a single part-length center support rib 72 mounted to the lower surface 74 of the seal plate 62 provide sufficient longitudinal stiffness. Lateral support ribs 76 mounted to the support members 66 provide sufficient lateral stiffness. As illustrated in FIG. 8, fewer lateral support ribs 76 are required for this arrangement, compared to the conventional sector plate assembly 18, 20, 22 design. In addition, the support ribs 70, 72, 76 may be up to fifty percent thinner than the support ribs 52, 54, 56 of a conventional sector plate assembly 18, 20, 22, preferably having a thickness 78 of approximately one-half inch as compared to conventional support ribs 52, 54, 56 which have a thickness of one inch or greater.

The ends 80 of the lateral support ribs 76 are welded to the sides 82, 84 of the side support ribs 70 and center support rib 72 to form a support structure 68 to which the seal plate 62 is mounted. Similar to conventional sector plate assemblies 18, 20, 22, multiple spot welds 86 are used to mount the side support ribs 70 to the seal plate 62. However, tabs 88 are used to mount the lateral support ribs 76 and center support rib 72 to the seal plate 62, instead of the spot welds 58 of the conventional sector plate assembly 18, 20, 22. The use of the tabs 88 provides two significant advantages.

First, the tabs 88 allow the flatness of the seal plate 62 to be adjusted as the seal plate 62 is mounted to the support structure 68. The upper ends 90 of the tabs 88 are welded to the lower surface 74 of the seal plate 62 at the appropriate positions for mounting the center and lateral support ribs 72, 76. As the tabs 88 are in turn welded to the associated support ribs 72, 76, the flatness of the seal plate 62 is monitored and the seal plate 62 is urged toward or away from the support structure 68 to eliminate any distortion which resulted from the welding operation for mounting the tabs 88 to the seal plate 62.

Second, the tabs 88 reduce the weld length required to mount the support ribs 72, 76 to the seal plate 62. Preferably, each tab 88 has a length 92 of 3 inches. Although each tab 88 is welded 94 along its full length 92 to the seal plate 62, the limited number of tabs 88 and the fixed length 92 of each tab 88 reduces the total length of the weld required to mount each rib 72, 76, compared to conventional sector plate assemblies 18, 20, 22. That is, a total weld length of 30 inches is required to mount the support ribs 72, 76 of the subject invention to the seal plate 62 while total weld lengths of 75 inches are generally required in conventional sector plate assemblies 18, 20, 22. The reduced weld length reduces the weld-induced warping of the seal plate 62 sufficiently to allow the warping that does occur to be eliminated as described above. Therefore, the upper surface 96 of the seal plate 62 does not require machining after the sector plate 64 is assembled.

Compared to conventional sector plate assemblies 18, 20, 22, the low distortion sector plate assembly 64 is lighter due to: 1) the reduction in the number of structural parts; 2) the reduction in the size of the lateral and center support ribs; 76, 72 and 3) the reduction of weld material on the face of the seal plate 62 through the use of the tabs 88. The multi-point support design provides the seal plate support required to maintain the sealing surface tolerances. It should be appreciated that the elimination of the final machining step, the reduction in the number of parts and the number of welds, and the reduced size of the support ribs 72, 76 results in a significant cost savings with no reduction in performance.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An air preheater including a post having oppositely disposed axial ends, a rotor housing, a rotor located in the rotor housing and rotatable around the post, and a plurality of sector plates on each axial end of the air preheater, each of the sector plates comprising:

a seal plate having a sealing surface and an oppositely disposed mounting surface, the seal plate extending longitudinally from a radially inner end to a radially outer end;

a rigid support structure;

a plurality of tabs mounting at least a portion of the support structure to the mounting surface of the seal plate; and a plurality of support members mounting the support structure to the housing.

2. The air preheater of claim 1 wherein the support structure includes first and second side support ribs longitudinally extending from the inner end of the seal plate to the outer end of the seal plate and a single center support rib extending longitudinally from the outer end of the seal plate to a position intermediate the inner and outer ends of the seal plate.

3. The air preheater of claim 2 wherein the support structure further includes a plurality of lateral support ribs.

4. The air preheater of claim 3 wherein the side support ribs, center support rib, and lateral support ribs each have a thickness which is less than one inch.

5. The air preheater of claim 3 wherein the tabs mount the lateral support ribs and the center support rib to the mounting surface of the seal plate.

6. The air preheater of claim 5 wherein the side support ribs are welded to the seal plate.

7. The air preheater of claim 5 wherein each of the tabs has oppositely disposed first and second ends and a first end portion extending from the first end, the second end being welded to the mounting surface of the seal plate and the first end portion being mounted to the support structure.

8. The air preheater of claim 7 wherein each of the tabs has a length, each of the tabs being welded along its full length to the mounting surface of the seal plate.

9. The air preheater of claim 3 wherein the lateral support ribs are composed of two inner lateral support ribs extending from the first side support rib to the second side support rib and four outer later support ribs, a first pair of the outer lateral support ribs extending from the first side support rib to the center support rib and a second pair of the outer lateral support ribs extending from the second side support rib to the center support rib.

10. The air preheater of claim 9 wherein each of the side support ribs and center support rib have oppositely disposed sides and each of the lateral support ribs has oppositely disposed ends, the ends of the inner lateral support ribs being welded to the first and second side support ribs, the ends of the first pair of outer lateral support ribs being welded to the first side support rib and the center support rib, and the ends of the second pair of outer lateral support ribs being welded to the second side support rib and the center support rib.

11. The air preheater of claim 3 wherein support members are mounted to each of the lateral support ribs adjacent one of the side support ribs.

12. A sector plate for an air preheater comprising:
 a seal plate having a sealing surface and an oppositely disposed mounting surface;
 a rigid support structure;
 a plurality of tabs mounting at least a portion of the support structure to the mounting surface of the seal plate; and
 a plurality of support members mounted to the support structure, the support members being adapted for mounting the sector plate to the air preheater.

13. The sector plate of claim 12 wherein the seal plate extends longitudinally from an inner end to an outer end and the support structure includes first and second side support ribs longitudinally extending from the inner end of the seal plate to the outer end of the seal plate, a single center support rib extending longitudinally from the outer end of the seal plate to a position intermediate the inner and outer ends of the seal plate, and a plurality of lateral support ribs.

14. The sector plate of claim 13 wherein the tabs mount the lateral support ribs and the center support rib to the mounting surface of the seal plate and the side support ribs are welded to the seal plate.

15. The sector plate of claim 14 wherein each of the tabs has a first end portion welded to the support structure and an oppositely disposed second end welded to the mounting surface of the seal plate.

16. The sector plate of claim 14 wherein each of the tabs has a length, each of the tabs being welded along its full length to the mounting surface of the seal plate.

17. The sector plate of claim 13 wherein the lateral support ribs are composed of two inner lateral support ribs extending from the first side support rib to the second side support rib and four outer later support ribs, a first pair of the outer lateral support ribs extending from the first side support rib to the center support rib and a second pair of the outer lateral support ribs extending from the second side support rib to the center support rib.

18. The sector plate of claim 17 wherein each of the side support ribs and center support rib have oppositely disposed sides and each of the lateral support ribs has oppositely disposed ends, the ends of the inner lateral support ribs being welded to the first and second side support ribs, the ends of the first pair of outer lateral support ribs being welded to the first side support rib and the center support rib, and the ends of the second pair of outer lateral support ribs being welded to the second side support rib and the center support rib.

19. The sector plate of claim 17 wherein support members are mounted to each of the lateral support ribs adjacent one of the side support ribs.

* * * * *